(12) United States Patent
Olsson et al.

(10) Patent No.: US 11,685,383 B2
(45) Date of Patent: Jun. 27, 2023

(54) SAFETY MECHANISM FOR ASSURING DRIVER ENGAGEMENT DURING AUTONOMOUS DRIVE

(71) Applicant: Zenuity AB, Gothenburg (SE)

(72) Inventors: Claes Olsson, Mölnlycke (SE); Henrik Eriksson, Hovås (SE); Andreas Ekenberg, Torslanda (SE); Jonas Nilsson, Los Gatos, CA (US)

(73) Assignee: Zenuity AB, Gothenburg (SE)

( * ) Notice: Subject to any disclaimer, the term of this patent is extended or adjusted under 35 U.S.C. 154(b) by 123 days.

(21) Appl. No.: 16/857,553

(22) Filed: Apr. 24, 2020

(65) Prior Publication Data

US 2020/0339131 A1 Oct. 29, 2020

(30) Foreign Application Priority Data

Apr. 26, 2019 (EP) ..................................... 19171430

(51) Int. Cl.
*B60W 40/08* (2012.01)
*B60W 60/00* (2020.01)

(52) U.S. Cl.
CPC ........ *B60W 40/08* (2013.01); *B60W 60/0013* (2020.02); *B60W 2040/0872* (2013.01);
(Continued)

(58) Field of Classification Search
CPC ............ B60W 40/08; B60W 60/0013; B60W 2540/225; B60W 2540/229;
(Continued)

(56) References Cited

U.S. PATENT DOCUMENTS

2003/0181822 A1* 9/2003 Victor ...................... A61B 5/11
600/558
2004/0044293 A1* 3/2004 Burton .................. B60W 40/08
600/544
(Continued)

FOREIGN PATENT DOCUMENTS

DE 102008038816 A1 2/2010
DE 102015211126 A1 12/2016
(Continued)

OTHER PUBLICATIONS

Extended European Search Report dated Nov. 5, 2019 for European Patent Application No. 19171430.2, 8 pages.
(Continued)

*Primary Examiner* — Nadeem Odeh
(74) *Attorney, Agent, or Firm* — Sage Patent Group

(57) ABSTRACT

A method for controlling a driving assistance feature of a vehicle is disclosed. The method comprises determining a state of a driver of the vehicle by means of a driver monitoring system (DMS) the state of the driver comprising at least one attention parameter, and comparing the determined state of the driver with a predefined attention model. The predefined attention model comprises an independent threshold range for each attention parameter. The method further comprises controlling the driving assistance feature based on the comparison between the determined state of the driver and the predefined attention model.

16 Claims, 4 Drawing Sheets

(52) U.S. Cl.
CPC . *B60W 2540/221* (2020.02); *B60W 2540/225* (2020.02); *B60W 2540/229* (2020.02)

(58) Field of Classification Search
CPC ... B60W 2540/221; B60W 2040/0872; B60W 2040/0863; B60W 50/14; B60W 2040/0818; B60W 2050/0215; B60W 40/00; B60W 2040/0827; B60W 2050/143; B60K 28/066; B60K 28/06
See application file for complete search history.

(56) References Cited

U.S. PATENT DOCUMENTS

| | | | | |
|---|---|---|---|---|
| 2014/0139341 | A1* | 5/2014 | Green | A61B 5/6893 340/576 |
| 2016/0001781 | A1* | 1/2016 | Fung | G16H 50/20 701/36 |
| 2017/0190337 | A1 | 7/2017 | Singh et al. | |
| 2019/0122525 | A1 | 4/2019 | Lancelle | |
| 2019/0122595 | A1 | 4/2019 | Lancelle | |
| 2019/0227547 | A1* | 7/2019 | Sugahara | G08G 1/16 |
| 2019/0241195 | A1* | 8/2019 | Sakamoto | B60W 50/04 |
| 2020/0198644 | A1* | 6/2020 | Hutchings | B60W 40/09 |
| 2020/0239007 | A1* | 7/2020 | Sobhany | B60W 50/087 |
| 2020/0282984 | A1* | 9/2020 | Mizoguchi | B60W 60/0015 |
| 2021/0350155 | A1* | 11/2021 | Takinami | G08B 21/06 |

FOREIGN PATENT DOCUMENTS

| | | |
|---|---|---|
| FR | 3037026 A1 | 12/2016 |
| WO | 2017149046 A1 | 9/2017 |
| WO | 2018089024 A1 | 5/2018 |

OTHER PUBLICATIONS

Office Action dated Apr. 15, 2023 for Chinese Application No. 202010340371.X, 9 pages.

* cited by examiner

SAFETY MECHANISM FOR ASSURING DRIVER ENGAGEMENT DURING AUTONOMOUS DRIVE

CROSS-REFERENCE TO RELATED APPLICATIONS

The present application for patent claims priority to European Patent Application Ser. No. 19171430.2, entitled "SAFETY MECHANISM FOR ASSURING DRIVER ENGAGEMENT DURING AUTONOMOUS DRIVE" filed on Apr. 26, 2019, assigned to the assignee hereof, and expressly incorporated herein by reference.

TECHNICAL FIELD OF THE INVENTION

The present disclosure relates to the field of autonomous and semi-autonomous driving. In particular, the present disclosure relates to a safety mechanism for assuring driver engagement during autonomous drive.

BACKGROUND

Various imaging systems are today used in vehicles to monitor driver and/or passengers in the vehicle. More specifically, the imaging systems generally comprise one or more cameras focused on a driver of the vehicle in order to capture images of the driver's face so to determine a driver state. The driver state is determined based on various facial characteristics of the driver including the position, orientation, and movement of the driver's eyes, face and head. Accordingly, various other vehicle systems can use the determined driver state in order to control different vehicle functions. It is known that lack of driver awareness and alertness contribute to the number of traffic accidents, particularly for long-distance heavy truck drivers who spend many hours on the road. Lack of alertness may delay a driver's response to a traffic condition by only a fraction of a second.

For example, the driver of the vehicle becoming drowsy and then falling asleep causes a significant number of traffic accidents. Oftentimes, the drivers are not even aware of their sleepiness or drowsiness prior to actually falling asleep. As a remedy, it has been proposed to monitor the facial characteristics of the vehicle driver, and thereby anticipate when the driver is becoming drowsy, and to alert the driver before the driver falls asleep. One proposed technique employs video cameras focused on the driver's face for monitoring the eye of the driver, such systems fall under the general category of driver monitoring systems (DMSs).

Other known driver monitoring systems, in addition to image based systems, have been proposed for monitoring the alertness of the driver, such as e.g. steering wheel activation sensors to monitor movement of the steering wheel, heart rate sensors that attempt to determine if a driver is falling asleep.

It is therefore of crucial importance that the vehicle systems aiding to reduce the risk of such accidents (such as the DMS), are reliable. There is therefore a need for new and improved methods and systems that can provide driver monitoring with high Automotive Safety Integrity Level (ASIL) without causing high penalties in mass, complexity and cost.

SUMMARY OF THE INVENTION

It is therefore an object of the present disclosure to provide a method for controlling a driving assistance feature of a vehicle, a non-transitory computer-readable storage medium, a vehicle control device, and a vehicle comprising such a control device, which alleviate all or at least some of the drawbacks of presently known solutions.

This object is achieved by means of a method for controlling a driving assistance feature of a vehicle, a non-transitory computer-readable storage medium, a vehicle control device, and a vehicle comprising such a control device as defined in the appended claims. The term exemplary is in the present context to be understood as serving as an instance, example or illustration.

According to a first aspect of the present disclosure, there is provided a method for controlling a driving assistance feature of a vehicle. The method comprises determining a state of a driver of the vehicle by means of a driver monitoring system (DMS) the state of the driver comprising at least one attention parameter, and comparing the determined state of the driver with a predefined attention model. The predefined attention model comprises an independent threshold range for each attention parameter. The method further comprises controlling the driving assistance feature based on the comparison between the determined state of the driver and the predefined attention model.

Hereby presenting a reliable and cost effective solution for verifying the functionality of a driver monitoring system, and thereby increasing the overall safety of the vehicle. In more detail, the proposed method can be construed as a DMS signal plausibility check, i.e. a check to verify how reliable the output of the DMS is. The plausibility check may be understood as that the measurement of e.g. driver eye characteristics, are compared with a predefined attention model in order to see if the DMS measurement is indicating very abnormal behaviour (e.g. abnormally high blink frequency and/or a very fast blink duration). If the DMS measurement is indicating abnormal behaviour, then it is concluded that the DMS cannot be trusted, whereupon one can disengage any Autonomous Drive (AD) or Advanced Driver Assistance System (ADAS) feature relying on the (faulty) DMS.

The driver monitoring system may for example comprise one or more cameras configured to monitor and track the eyes of the driver in order to determine for example a blink frequency, a blink duration, a direction duration, an average gaze direction for a predefined time period, and/or an eye opening size. Moreover, in accordance with an exemplary embodiment, the at least one attention parameter comprises at least one of a blink frequency, a blink duration, a direction duration, an average gaze direction for a predefined time period, and an eye opening size.

Further, according to an exemplary embodiment of the present disclosure, the step of comparing the determined state of the driver with a predefined attention model comprises comparing each attention parameter with each corresponding independent threshold range. Moreover, the step of controlling the driving assistance feature comprises deactivating the driving assistance feature if any one of the attention parameters is outside of the corresponding independent threshold range.

Still further, according to another exemplary embodiment of the present disclosure, the method further comprises sending a feedback signal to the driver based on the determined state of the driver, measuring at least one reaction parameter of the driver by means of the driver monitoring system after the feedback signal has been sent, and comparing the measured at least one reaction parameter with a stored reaction model. In other words, the proposed method further includes doing a check to ensure that Human Machine Interface (HMI), such as e.g. infotainment screens, loudspeakers, vibration actuators, etc., are working properly. In more detail, by checking the driver reaction on a feedback signal (e.g. a "beeping" sound output from the loudspeakers) a simple and efficient means for verifying the functionality of the HMI is provided. Thus, the need for e.g. expensive and robust speaker solutions is alleviated in order to fulfil strict loudspeaker requirements for issuing driver warnings can at least partly be alleviated.

According to a second aspect of the present disclosure, there is provided a non-transitory computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

Further, according to a third aspect of the present invention there is provided a vehicle control device for controlling a driving assistance feature of a vehicle, the vehicle control device comprising a control circuit. The control circuit is configured to determine a state of a driver of the vehicle by means of a driver monitoring system (DMS) the state of the driver comprising at least one attention parameter, compare the determined state of the driver with a predefined attention model, the predefined attention model comprising an independent threshold range for each attention parameter. The control circuit is further configured to control the driving assistance feature based on the comparison between the determined state of the driver and a predefined attention model. With this aspect of the disclosure, similar advantages and preferred features are present as in the previously discussed first aspect of the disclosure.

Still further, according to a fourth aspect of the present disclosure, there is provided a vehicle comprising a driver monitoring system (DMS) for measuring eye and head position, driver attention and fatigue, and a vehicle control device according to any one of the embodiments disclosed herein. With this aspect of the disclosure, similar advantages and preferred features are present as in the previously discussed first aspect of the disclosure.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
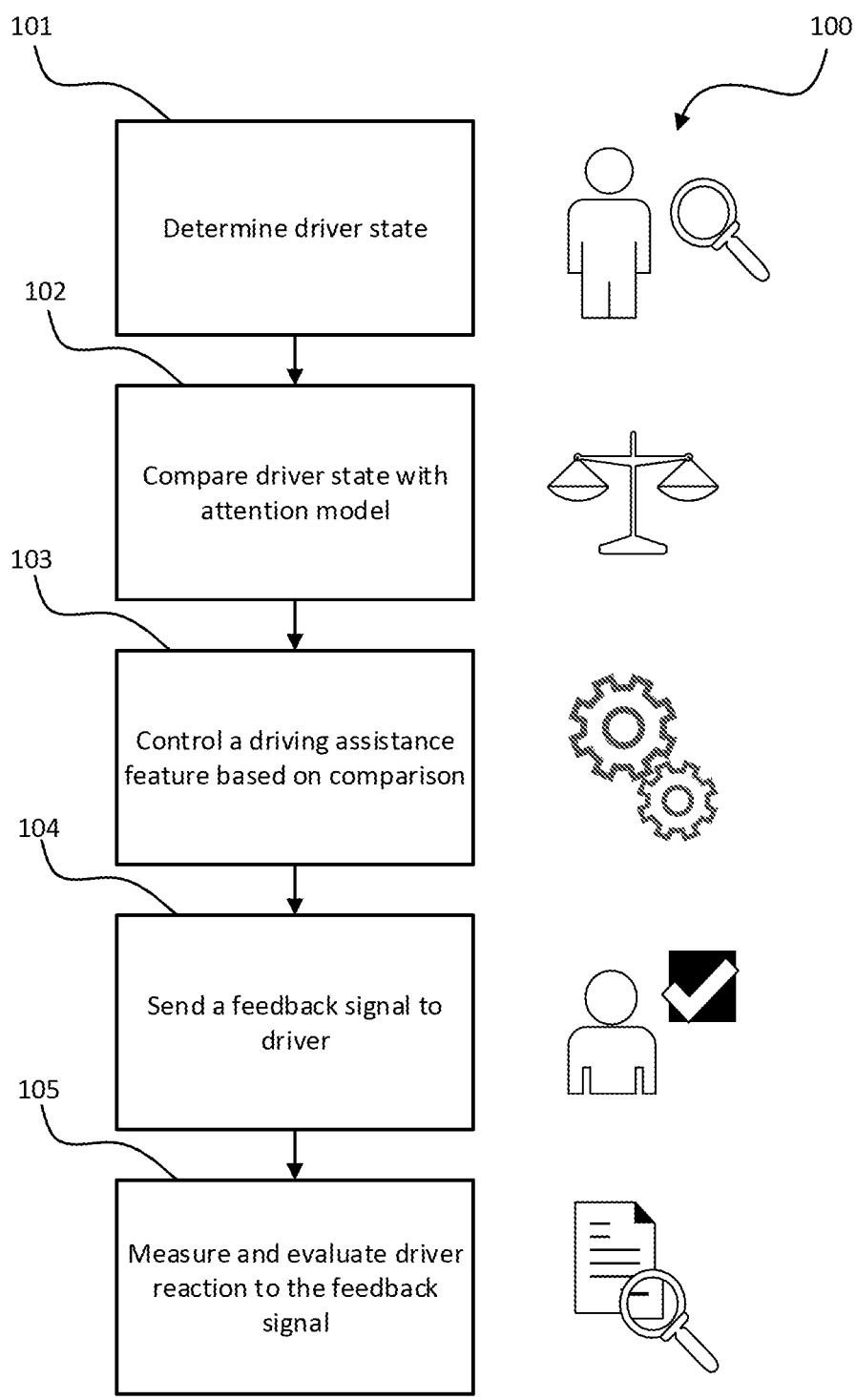
FIG. 1 is a schematic flow chart representation of a method for controlling a driving assistance feature of a vehicle in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 illustrates a flow chart representation of a method 100 for controlling a driving assistance feature of a vehicle. The method comprises determining 101 a state of a driver of the vehicle by means of a driver monitoring system (DMS), where the state of the driver comprises at least one attention parameter. The driver monitoring system may for example comprise one or more cameras configured to monitor and track the eyes of the driver in order to determine for example a blink frequency, a blink duration, a direction duration, an average gaze direction for a predefined time period, and/or an eye opening size.

The method 100 further comprises comparing the determined state of the driver with a predefined attention model, which comprises an independent threshold range for each attention parameter. For example, if the determined driver state includes an attention parameter in the form of a blink frequency, then the predefined attention model will comprise a threshold range for the determined blink frequency. The independent threshold range for the blink frequency (can also be referred to as a blink rate) may for example be 5-15 blinks per minute.

Further, the driving assistance feature (e.g. hands-off full autonomous drive, adaptive cruise control, etc.) is controlled 103 based on the comparison 102 between the determined 101 state of the driver with the predefined attention model. In more detail, the comparison 103 may be performed such that each attention parameter (as given by the determined 101 state of the driver) is compared with each corresponding independent threshold range. Moreover, the step of controlling 103 the driving assistance feature may comprise deactivating the driving assistance feature if any one of the attention parameters is outside of the corresponding independent threshold range.

The comparison 102 between the determined 101 driver state and the predefined attention model can be construed as a DMS plausibility check. In other words, a check to see if the DMS is operating correctly. Thus, the step of comparing 102 the state of the driver with the predefined attention model is not performed with the purpose of determining if the driver is paying attention to the road, but instead to verify the integrity of the DMS. Thus, the step of comparing 102 the determined 101 driver state with the predefined attention model may further comprise performing a plausibility check of the DMS, and then control 103 the driving assistance feature based on the plausibility check.

In more detail, the plausibility check can be construed as a step of determining a reliability of the DMS, by comparing the DMS output (attention parameters) with typical driver behaviour in terms of e.g. glance and blink behaviour. For example, the DMS may conclude that the driver is not drowsy and attentive, but the plausibility check indicates that the behaviour of the driver is atypical (e.g. blink frequency outside of the predefined threshold range). Thus, based on the plausibility check it is concluded that the DMS may not be operating correctly, and that the "drowsiness detection feature" cannot be trusted, wherefore any driver assistance system relying on the "drowsiness detection feature" is inactivated.

In the "plausibility check", at least one independent attention parameter is evaluated. For the signals to pass the check, all conditions have to be fulfilled. For every additional and independent condition, the likelihood of accepting a false signal decreases. In other words, the method works as such that if the functionality of the DMS cannot be asserted, then the AD/ADAS features relying upon the DMS are preferably deactivated. Thus, if a single attention parameter is determined to be outside of the associated independent threshold range then the DMS function cannot be trusted, and any driving assistance feature relying upon the DMS's functionality are turned off.

The method 100 may further optionally include a Human Machine Interface (HMI) check, which aims to reduce the risk that the reminders (sent to the driver) from the DMS do not reach the driver. In short, the HMI check assesses the correlation between the reminder-signalling (e.g. audio signal, visual feedback, tactile feedback) and the corresponding effect of the driver over time. Accordingly, the method 100 may further comprise sending 104 a feedback signal to the driver based on the determined state of the driver (e.g. if it is determined that the driver is not paying sufficient attention to the road, an audio signal may be output via the in-vehicle speakers). Next, at least one reaction parameter is measured 105 by means of the DMS after the feedback signal has been sent, and the measured 105 reaction parameter is compared 105 with a stored (predefined) reaction model that comprises at least one reaction parameter range. The reaction parameter may be one or more of a gaze direction, a change in gaze direction, a speed of change of gaze direction, a head direction, a change in head direction, and a speed of change of a head direction.

In accordance with an illustrative example, the DMS determines that the driver is inattentive to the road ahead, and an audio signal is played via the in-vehicle speaker system. The DMS is then arranged to monitor the reaction of the driver to the audio signal, in order to for example check if the signal actually is heard/received by the driver. If no reaction is detected by the DMS, it may be indicative that the audio system is not working properly, and a different type of signal (e.g. vibrations in the steering wheel, or a visual cue in the infotainment system) may be generated instead to catch the driver's attention. By performing this test or verification of the HMI of the vehicle, the ASIL of the HMI system can be increased in a simple and cost effective manner. In other words, the need for expensive loudspeakers in order to increase the ASIL of the audio feedback from the HMI is reduced.

As the skilled reader readily understands, the steps of the presented method 100 are not necessarily bound to the order as illustrated in FIG. 1. Instead several of the steps may be performed in a different order or in parallel to each other. For example, the DMS of the vehicle may be configured to continuously measure various attention and reaction parameters of the driver wherefore the "DMS plausibility check" and the "HMI check" can be performed in parallel with the normal DMS operation (e.g. drowsiness monitoring). Moreover, the "HMI check" can be performed independently from the "DMS plausibility check".

Figure 2:
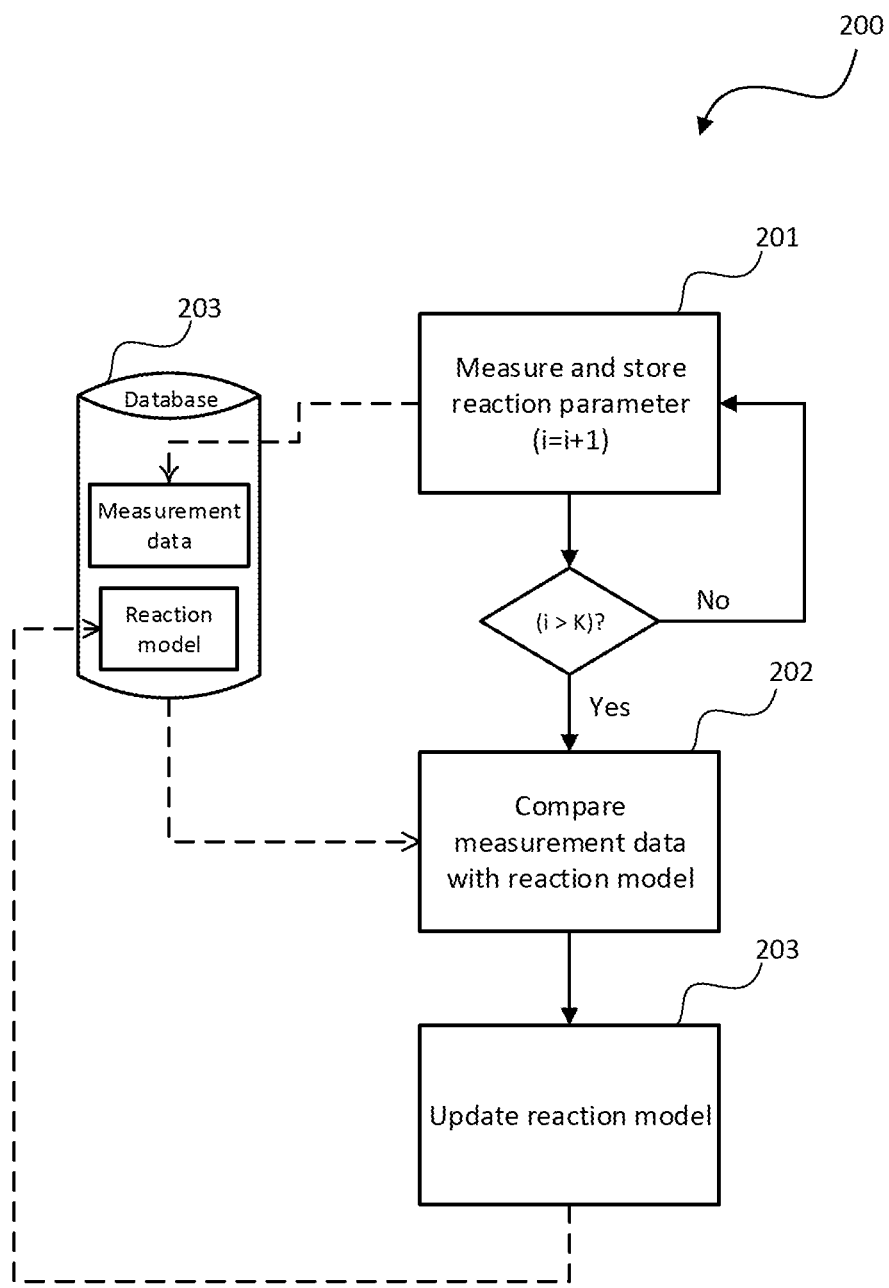
FIG. 2 is a schematic flow chart representation of a method for controlling a driving assistance feature of a vehicle in accordance with an embodiment of the present disclosure.

Furthermore, the method 100 may comprise a personalization solution, i.e. a process where the reaction model is personalized to a specific individual. This is in order to further increase the reliability of the reaction measurements since different individuals react in different ways. An example of a personalization process is shown in FIG. 2. In other words, FIG. 2 illustrates a flow chart representation of a method 200 according to an exemplary embodiment of the present disclosure.

The predefined reaction model is stored together with measurement data in a database 203, which can be remote or local (i.e. in the vehicle). The reaction model comprises at least one reaction parameter range, e.g. a reaction time range based on a change of direction of the driver's gaze. For example, a reaction parameter may be a time until the DMS detects a change in gaze direction from an "irrelevant" direction to an attentive direction (i.e. towards the heading direction of the vehicle), and the associated reaction parameter range may be between 0.5 and 1.5 seconds.

Thus, the method 200 comprises repeating the measurement 201 of the one or more reaction parameters of the driver a plurality (K) of times, and storing 201 the measurements. K can be any arbitrarily selected positive integer depending on the desired application and specifications. This method 200 can be performed either separately or in parallel with the method 100 described in reference to FIG. 1. Thus, the reaction model can be dynamic and updated while in use, or it can be done in order to "train" the system to be personalized for a specific driver. Next, the stored measurement data is compared 202 with the stored reaction model, and the reaction model is updated 203 based on this comparison 202. In more detail, one or more reaction parameters ranges are updated 203 based on the comparison between the stored plurality of measurements and the stored reaction model.

For example, if a base setting (i.e. factory setting) is that a driver should react with a change in gaze direction within the range of 0.5 and 1.5 seconds, and the stored measurements show that the current driver is a bit slower in his/her reactions having an average reaction time of 1.25 seconds. Then the model may be updated to have a reaction parameter range (change of gaze direction) of 0.75 to 1.75 seconds instead in order to reduce the risk of the system outputting a false positive or false negative.

The attention model and reaction model may be in the form of self-learning models (e.g. artificial neural networks such as a machine learning algorithms) By using a self-learning model, further input data can be used to make the associated attention parameter thresholds and reaction parameter thresholds more dynamic, and the general solution more accurate. For example, if the driver is talking to a passenger or on the telephone, the reaction thresholds may be adjusted upwards allowing for slower reactions. Thereby reducing the risk of erroneously concluding that the HMI output is malfunctioning. Other input data may for example be map data, perception system data (e.g. RADAR or LIDAR measurements), number of occupants, traffic data, and so forth. Moreover, by personalizing the attention model and reaction model narrower threshold ranges can be employed, which increases the integrity level of the DMS and the HMI, respectively, since the requirements to pass a "check" will be tougher.

Figure 3:
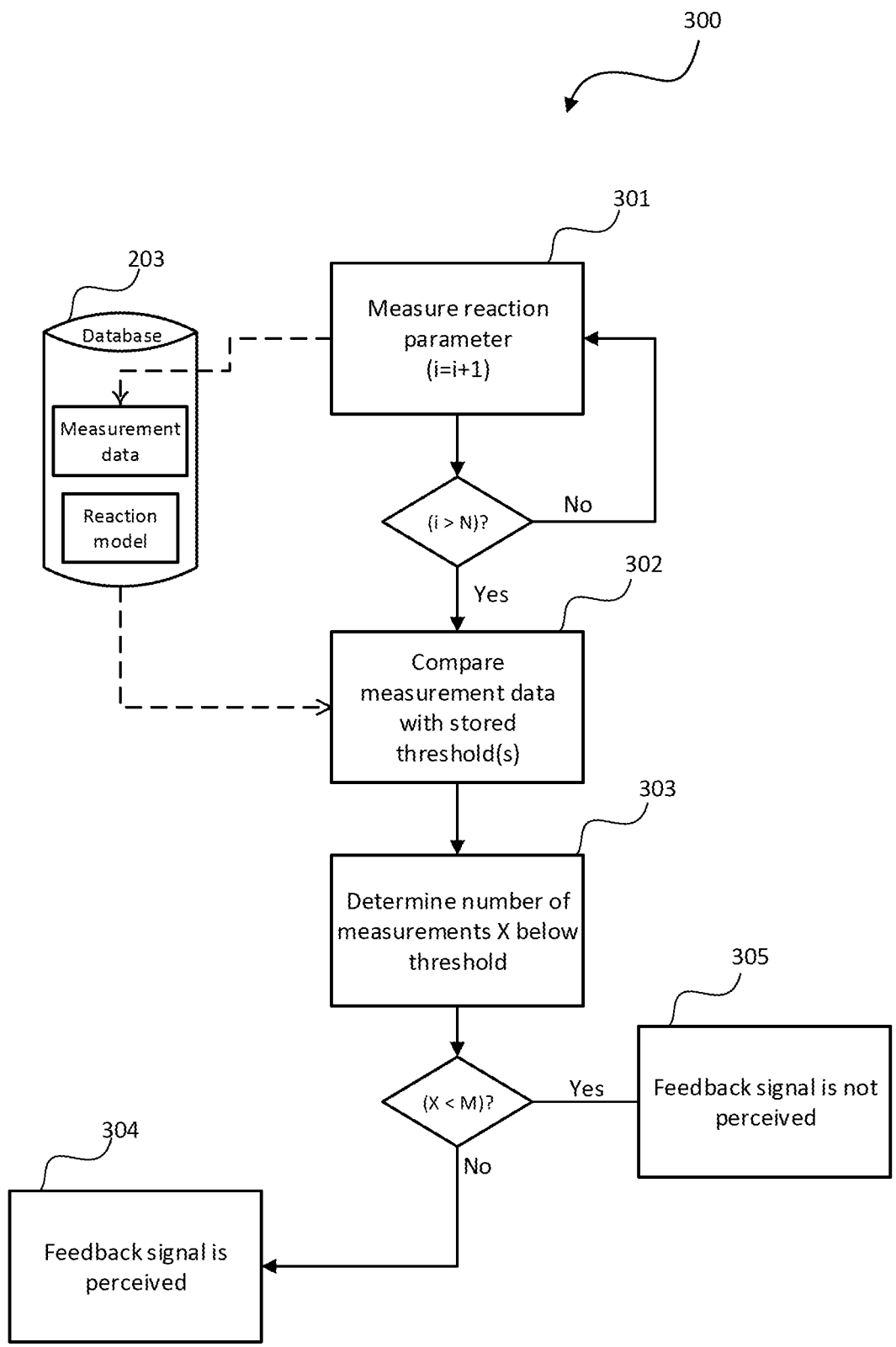
FIG. 3 a schematic flow chart representation of a method for controlling a driving assistance feature of a vehicle in accordance with an embodiment of the present disclosure.

Further, FIG. 3 illustrates a flow-chart representation of a method for controlling a driving assistance feature of a vehicle in accordance with another exemplary embodiment of the present invention. Similar to the embodiment discussed with reference to FIG. 2, the stored reaction model comprises a time threshold for each reaction parameter, i.e. a minimum time limit before which the driver is expected to react to the generated feedback signal (e.g. audio signal). The method 300 comprises measuring 301 one or more reaction parameters after the feedback signal has been outputted and comparing 302 the measurement result with a corresponding time threshold. More specifically, the method 300 comprises repeating the measurement 301 of the one or more reaction parameters N times (N being a predefined positive integer). Next, the method 300 comprises determining 303 how many measurements, denoted by X, that were below the associated time threshold.

Still further, the method 300 comprises generating 304 a signal indicating that the feedback signal is perceived by the driver (i.e. the selected HMI output appears to be operational) if the number of measurements that indicated a reaction time below the associated threshold are above a predefined number M, M being a predefined positive integer>N. For example, M may be based on a certain percentage (e.g. 90%); meaning that if nine out of ten measurements indicate that the feedback signal is perceived by the driver, then it is concluded that the HMI is working properly.

Analogously, the method 300 comprises generating 305 a signal indicating that the feedback signal is not perceived by the driver (i.e. the selected HMI output does not appear to be operational) if the number of measurements that indicated a reaction time below the associated threshold are below the predefined number M. For example, if N is selected to be ten, and M is selected to be nine, then if there only are six measurements (i.e. X=6) that indicated a reaction time below the associated threshold, then it is concluded that the feedback signal is not perceived by the driver, and that the HMI is not working properly. Naturally, the type of data that is stored can be both in the form of raw measurement data, as well as comparison data (only indicating if each measurement is above or below a certain threshold).

Figure 4:
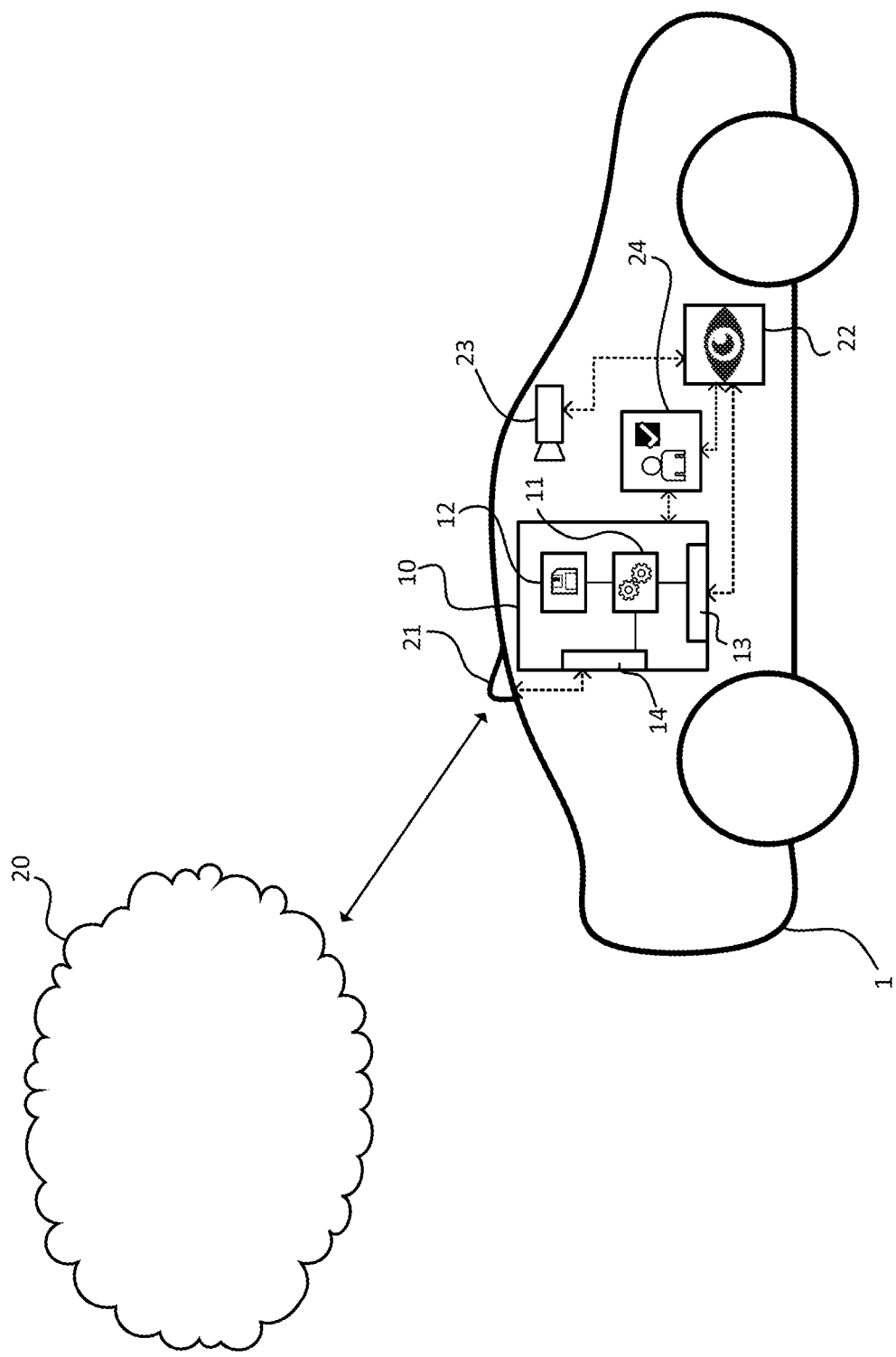
FIG. 4 is a schematic side view illustration of a vehicle comprising a vehicle control device for controlling a driving assistance feature of a vehicle in accordance with an embodiment of the present disclosure.

FIG. 4 is a schematic illustration of a vehicle 1 comprising a vehicle control device 10 in accordance with an exemplary embodiment of the present invention. The control device comprises one or more processors 11, one or more memories 12, one or more sensor interfaces 13, and one or more communication interfaces 14. The processor(s) 11 may also be referred to as a control circuit 11. The control circuit 11 is configured to execute instructions stored in the memory 12 to perform a method for controlling a driving assistance feature of a vehicle according to any one of the embodiments disclosed herein.

In more detail, the control circuit 11 is configured to determine a state of a driver of the vehicle 1 by means of a driver monitoring system (DMS) 22 the state of the driver comprising at least one attention parameter, and to compare the determined state of the driver with a predefined attention model. The predefined attention model comprises an independent threshold range for each attention parameter. Further, the control circuit 11 is configured to control the driving assistance feature based on the comparison between the determined state of the driver with a predefined attention model. The control circuit 11 can be configured to indirectly control the driving assistance feature by sending a control signal to a control unit of the driving assistance feature. The driver monitoring system 22 may for example comprise one or more cameras 23 configured to monitor and track the eyes of the driver in order to determine for example a blink frequency, a blink duration, a gaze direction duration, a head direction duration, an average gaze direction for a predefined time period, and/or an eye opening size.

The control circuit 11 is further configured to send a feedback signal (via an HMI 24) to the driver based on the determined state of the driver. For example, if the DMS 22 signal indicates that the driver inattentive, a feedback signal (e.g. loud beep) may be output from a loudspeaker within the vehicle in order to notify the driver. Furthermore, the control circuit 11 is configured to receive a signal comprising information about (a measurement of) at least one reaction parameter of the driver from the DMS 22 after the feedback signal has been sent. Naturally, the signal need to necessarily be directly sent from the DMS, but may be indirectly received from the DMS via an intermediate control system of the vehicle 1. Then, the control circuit 11 is configured to compare the received information about the at least one reaction parameter with a stored reaction model. The stored reaction model comprises one or more reaction parameter thresholds, and/or reaction parameter threshold ranges.

Further, the vehicle 1 may be connected to external network(s) 20 via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

The processor(s) 11 (associated with the vehicle control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry in the vehicle. The communication/antenna interface 14 may further provide the possibility to send output to a remote location (e.g. remote operator or control centre) by means of the antenna 21. Moreover, some sensors in the vehicle may communicate with the control device 10 using a local network setup, such as CAN bus, I2C, Ethernet, optical fibres, and so on. The communication interface 13 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compare the sensor data (movement of the other vehicle) with the predefined behaviour model. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for controlling a driving assistance feature of a vehicle, the method comprising:
   obtaining a determined state of a driver of the vehicle from a driver monitoring system, DMS,
   wherein the state of the driver comprising at least one attention parameter, and
   wherein the DMS comprises one or more cameras to monitor and track eyes of the driver;
   comparing the determined state of the driver with a predefined attention model in order to verify an integrity of the DMS, wherein the predefined attention model comprises an independent threshold range for each attention parameter of the at least one attention parameter;
   determining a reliability of the DMS based on the comparison, determining the reliability including identifying that the DMS is not operating correctly based on one or more of the attention parameters being outside the independent threshold range; and
   controlling the driving assistance feature based on the determined reliability of the DMS, wherein controlling the driving assistance feature includes controlling one of an autonomous driving function or a semi-autonomous driving function.

2. The method according to claim 1, wherein the step of comparing the determined state of the driver with the predefined attention model comprises comparing each attention parameter of the at least one attention parameter with each corresponding independent threshold range, and
   wherein the step of controlling the driving assistance feature comprises deactivating the driving assistance feature when any one of the attention parameters is outside of the corresponding independent threshold range.

3. The method according to claim 1, wherein the at least one attention parameter is selected from a group comprising a blink frequency, a blink duration, a direction duration, an average gaze direction for a predefined time period, and an eye opening size.

4. The method according to claim 1, further comprising:
   sending a feedback signal to the driver based on the determined state of the driver;
   measuring at least one reaction parameter of the driver by means of the driver monitoring system after the feedback signal has been sent; and
   comparing the measured at least one reaction parameter with a stored reaction model.

5. The method according to claim 4, wherein the stored reaction model comprises at least one reaction parameter range, the method further comprising:
   repeating the measurement of the at least one reaction parameter of the driver a plurality of times;
   storing the plurality of measurements;
   comparing the stored plurality of measurements with the stored reaction model; and
   updating the at least one reaction parameter range based on the comparison of the stored plurality of measurements with the stored reaction model.

6. The method according to claim 5, wherein the stored reaction model comprises a plurality of reaction parameter ranges, each reaction parameter range being associated with an individual reaction parameter, the method further comprising:
   updating the plurality of parameter ranges based on the comparison of the stored plurality of measurements with the stored reaction model.

7. The method according to claim 4, wherein the stored reaction model comprises time thresholds for each reaction parameter, the method further comprising:
   comparing the measured at least one reaction parameter to a corresponding time threshold;
   repeating the measurement and the comparison of the measured at least one reaction parameter to the corresponding time threshold N times, N being a predefined positive integer;
   generating a signal indicating that the feedback signal is perceived by the driver in response to M or more than M out of N measurements are being below the associated time threshold, M being a predefined positive integer<N; and
   generating a signal indicating that the feedback signal is not perceived by the driver in response to less than M out of N measurements are being below the associated time threshold.

8. The method according to claim 4, wherein the at least one reaction parameter is selected from a group comprising a gaze direction, a change in gaze direction, and a speed of change of gaze direction.

9. A non-transitory computer-readable storage medium storing one or more programs configured to be executed by one or more processors of a vehicle control system, the one or more programs comprising instructions for performing a method comprising:
   obtaining a determined state of a driver of the vehicle from a driver monitoring, DMS.
   wherein the state of a driver comprises at least one attention parameter, and
      wherein the DMS comprises one or more cameras to monitor and track eyes of the driver;
      comparing the determined state of the driver with a predefined attention model in order to verify an integrity of the DMS, wherein the predefined attention model comprising an independent threshold range for each attention parameter, of the at least one attention parameter;
      determining a reliability of the DMS based on the comparison, determining the reliability including identifying that the DMS is not operation correctly based on one or more of the attention parameters being outside the independent threshold range; and
   controlling the driving assistance feature based on the determined reliability of the DMS, wherein controlling the driving assistance feature includes controlling one of an autonomous driving function or a semi-autonomous driving function.

10. A vehicle control device for controlling a driving assistance feature of a vehicle, the vehicle control device comprising a control circuit configured to:
   obtain a determined state of a driver of the vehicle from a driver monitoring system, DMS,
   wherein the state of the driver comprising at least one attention parameter, and
   wherein the DMS comprises one or more cameras to monitor and track eyes of the driver;
   compare the determined state of the driver with a predefined attention model in order to verify an integrity of the DMS, wherein the predefined attention model comprises an independent threshold range for each attention parameter, of the at least one attention parameter;
   determine a reliability of the DMS based on the comparison, determining the reliability including identifying that the DMS is not operation correctly based on one or more of the attention parameters being outside the independent threshold range; and
   control the driving assistance feature based on the determined reliability of the DMS, wherein controlling the driving assistance feature includes controlling one of an autonomous driving function or a semi-autonomous driving function.

11. The vehicle control device according to claim 10, wherein the control circuit is configured to compare the determined state of the driver with the predefined attention model by comparing each attention parameter of the at least one attention parameter with each corresponding independent threshold range; and to control the driving assistance feature by deactivating the driving assistance feature in response to any one of the at least one attention parameter being outside of the corresponding independent threshold range.

12. The vehicle control device according to claim 10, wherein the at least one attention parameter is selected form a group comprising a blink frequency, a blink duration, a direction duration, an average gaze direction for a predefined time period, and an eye opening size.

13. The vehicle control device according to claim 10, wherein the control circuit is further configured to:
   send a feedback signal to the driver based on the determined state of the driver;
   receive a signal comprising information about at least one reaction parameter of the driver from the driver monitoring system after the feedback signal has been sent; and
   compare the information about the at least one reaction parameter with a stored reaction model.

14. The control device according to claim 13, wherein the at least one reaction parameter is selected from a group comprising a gaze direction, a change in gaze direction, and a speed of change of gaze direction.

15. A vehicle comprising:
   a driver monitoring system, DMS, for measuring eye and head position, driver attention and fatigue, wherein the DMS comprises one or more cameras to monitor and track eyes of a driver; and
   a vehicle control device for controlling a driving assistance feature of the vehicle, the vehicle control device comprising a control circuit configured to:
      obtained a determined state of the driver of the vehicle from the driver monitoring system, DMS, the state of the driver comprising at least one attention parameter;
      compare the determined state of the driver with a predefined attention model in order to verify an integrity of the DMS, wherein the predefined attention model comprises an independent threshold range for each attention parameter, of the at least one attention parameter;
      determine a reliability of the DMS based on the comparison, determining the reliability including identifying that the DMS is not operating correctly based on one or more of the attention parameters being outside the independent threshold range; and control the driving assistance feature based on the determined reliability of the DMS, wherein controlling the driving assistance feature includes controlling one of an autonomous driving function or a semi-autonomous driving function.

16. The vehicle according to claim 15, wherein the control circuit is further configured to:
send a feedback signal to the driver based on the determined state of the driver;
receive a signal comprising information about at least one reaction parameter of the driver from the driver monitoring system after the feedback signal has been sent; and
compare the information about the at least one reaction parameter with a stored reaction model,
wherein the at least one reaction parameter is selected from group comprising a gaze direction, a change in gaze direction, and a speed change of gaze direction.

* * * * *